Dec. 13, 1960 R. E. KLEVE 2,964,593

SOUND RECORDING AND REPRODUCING APPARATUS

Filed March 4, 1954 4 Sheets-Sheet 1

INVENTOR
ROBERT E. KLEVE

BY A. Yates Dowell

ATTORNEY

SOUND RECORDING AND REPRODUCING APPARATUS

Filed March 4, 1954 4 Sheets-Sheet 2

INVENTOR
ROBERT E. KLEVE

BY A. Yates Dowell
ATTORNEY

SOUND RECORDING AND REPRODUCING APPARATUS

Filed March 4, 1954 4 Sheets-Sheet 3

INVENTOR
ROBERT E. KLEVE
BY A. Yates Dowell
ATTORNEY

Dec. 13, 1960 R. E. KLEVE 2,964,593

SOUND RECORDING AND REPRODUCING APPARATUS

Filed March 4, 1954 4 Sheets-Sheet 4

INVENTOR
ROBERT E. KLEVE

BY A. Yates Dowell

ATTORNEY

United States Patent Office 2,964,593
Patented Dec. 13, 1960

2,964,593

SOUND RECORDING AND REPRODUCING APPARATUS

Robert Elick Kleve, 1008 7th St., Bismarck, N. Dak.

Filed Mar. 4, 1954, Ser. No. 413,984
16 Claims. (Cl. 179—100.2)

The present invention relates to sound recording and reproducing equipment and more particularly to equipment in which a large number of selected recordings may be played in a substantially continuous program.

Heretofore, various types of juke boxes, automatic record changers, and the like have been in use, but none of them has been entirely satisfactory from the point of carrying a large number of recordings which could be selectively usable and there has been no commercially successful machine for playing tape or wire recordings because of the difficulty in threading the tape or the wire and therefore these forms of records have not been used to any appreciable extent in commercial type "juke boxes."

Although some strand recording devices with automatic selecting means have been proposed, they have had limited application because the wires or tapes were permanently connected to the reels and the number of reels available for use was consequently very small and therefore the tape and wire recorders have not been satisfactory for this use.

An object of the present invention is to overcome the defects of the prior tape or wire recording type juke boxes and increase the capacity for the number of recordings available.

A further object is to provide a portable tape or wire recording device which is relatively small and may be carried from place to place for use in homes, offices, as well as in public places where additional amplifying equipment is provided.

A further object is to provide a threading mechanism for threading the end of the wire or tape from the supply reel to the power reel and also to return the free end upon completion of the recording.

Another object of the present invention is to provide a strand sound recording and reproducing structure in which the strands are mounted on reels and the reels may be interchanged by a simple operation without requiring complicated manual threading.

Figures 1, 4, 5, 6, 7, 8, 9, 10, 11:
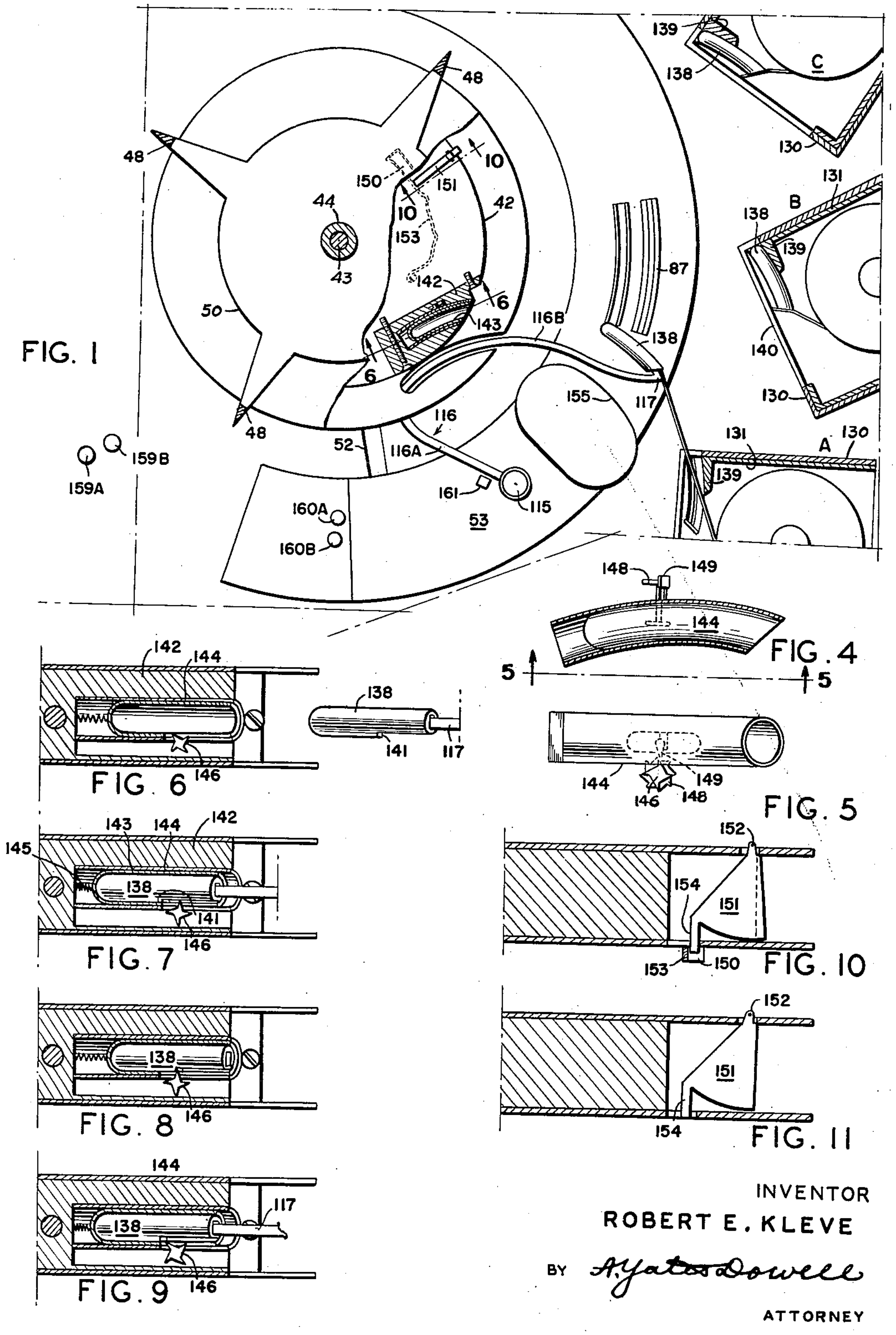
Figure 2:
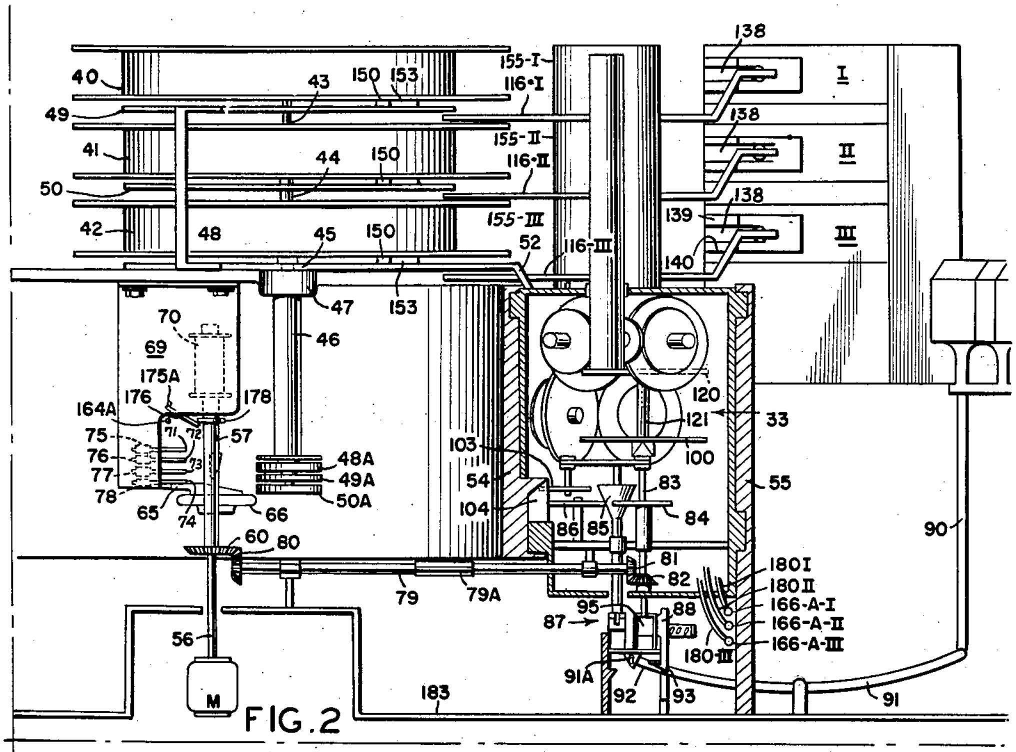
Figures 12, 12A:
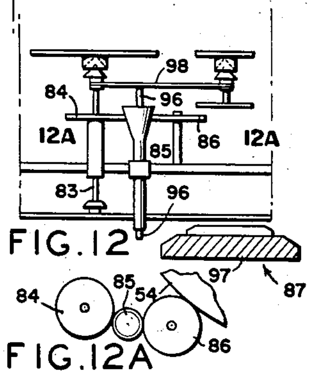
Figure 13:
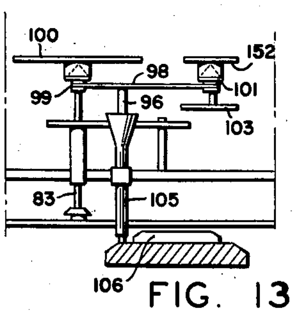
Figure 14:
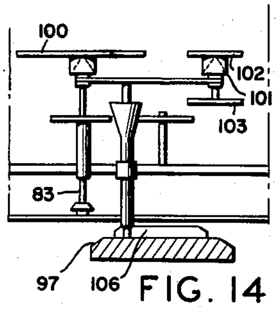
Figure 15:
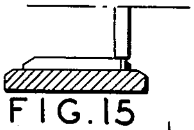
Figure 16:
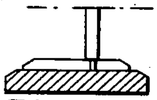
Figure 17:
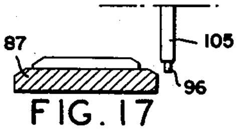
Figure 18:
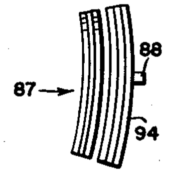
Figure 19:
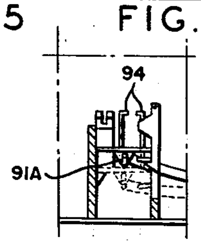
Figure 20:
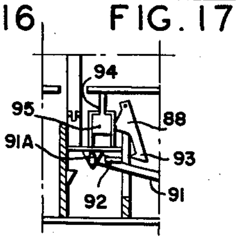
Figures 3, 24:
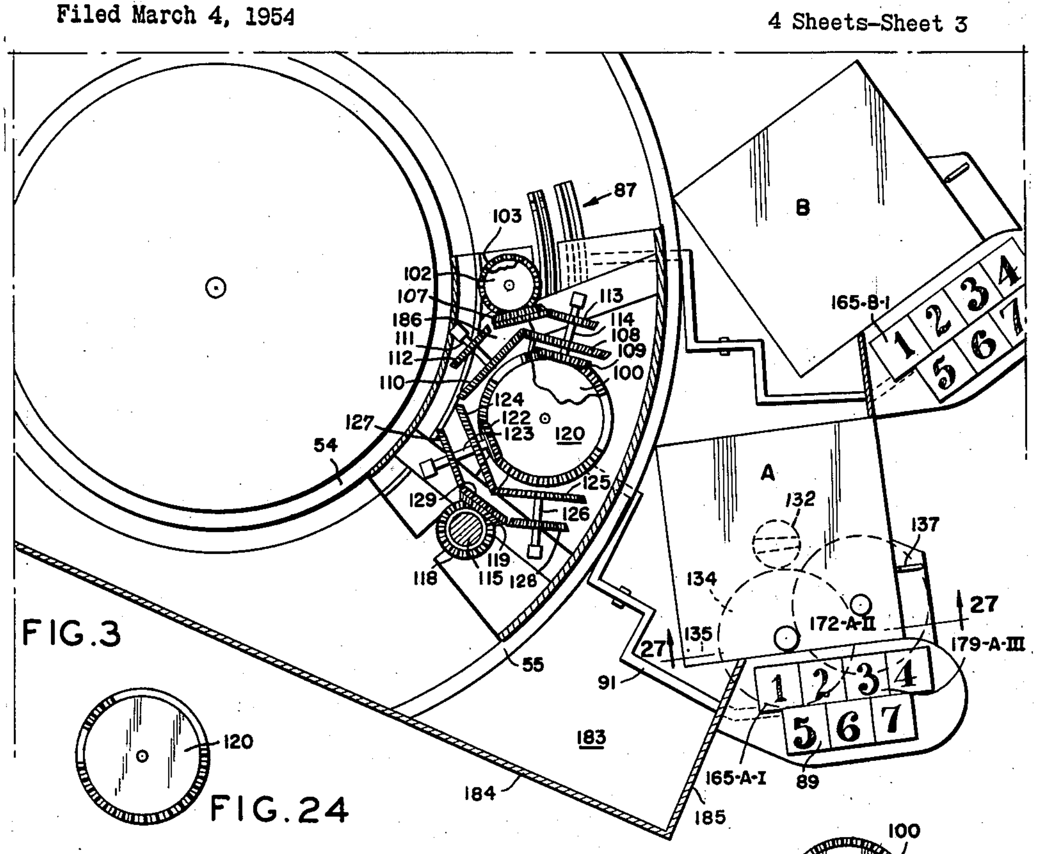
Figure 25:
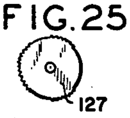
Figure 26:
Figure 21:
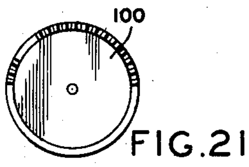
Figure 22:
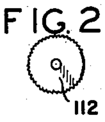
Figure 23:
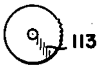
Figure 27:
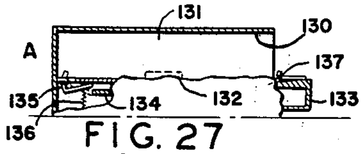
Figure 30:
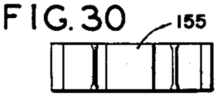
Figure 31:
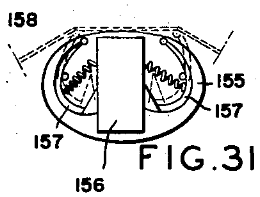
Figure 28:
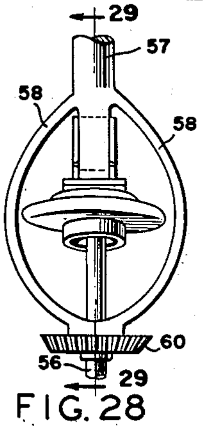
Figure 29:
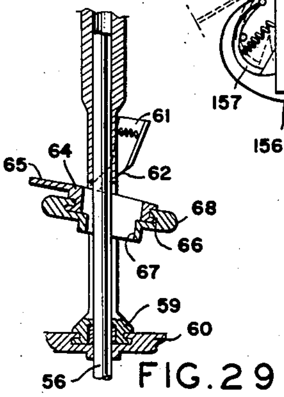
Figure 32:
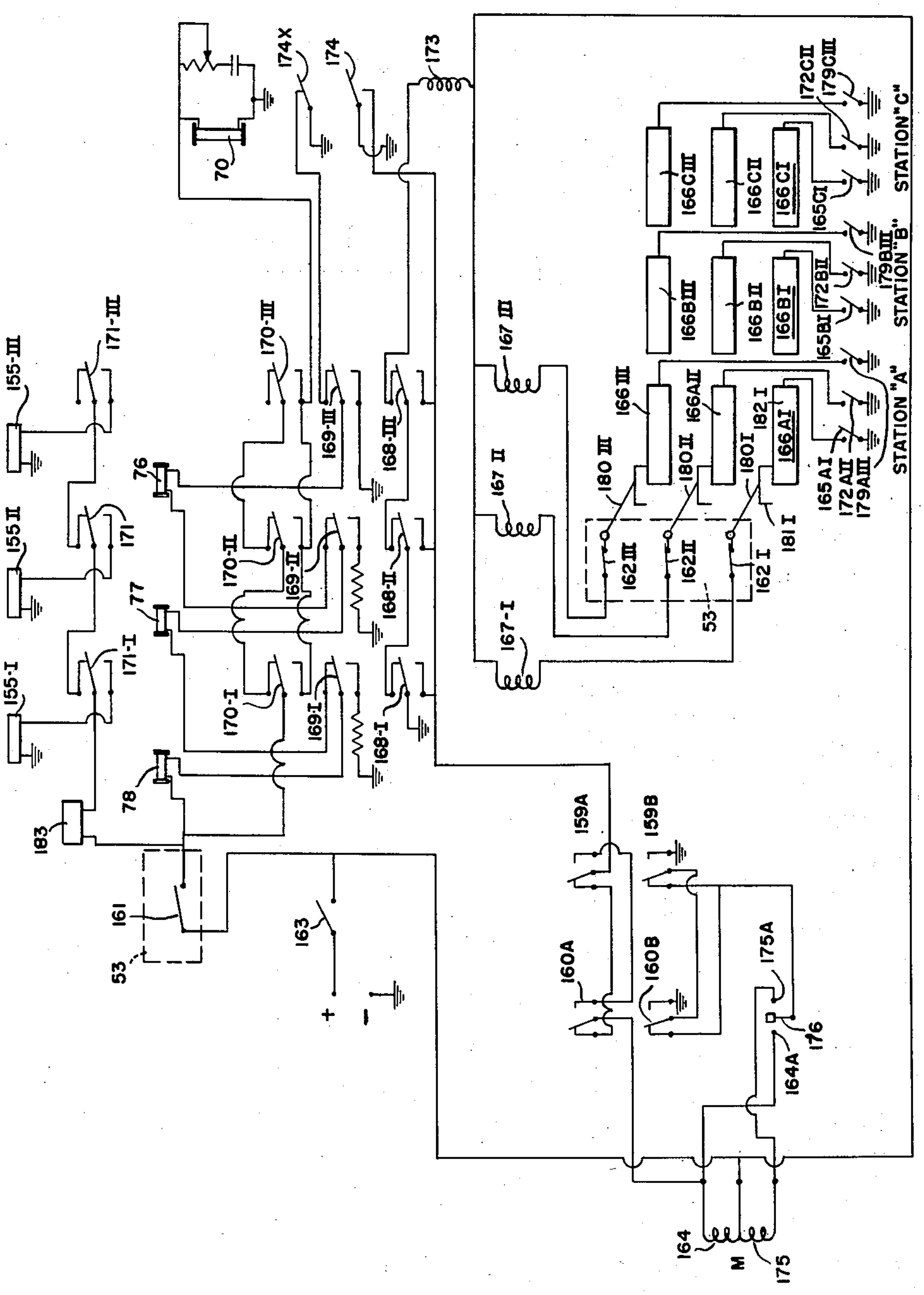

Other and further objects will become apparent as the description proceeds and upon reference to the drawings wherein:

Fig. 1 is a plan view with parts omitted and parts broken away showing the general arrangement of the central power reels, the arcuately movable carriage having recording heads thereon and the stacks or magazines of strand recordings arranged circumferentially of the power spool;

Fig. 2, an elevation with parts in transverse section showing one magazine or stack, the power reels, the carriage, and the arms for transferring the tape or wire from the supply reels to the power reels;

Fig. 3, a plan view of a portion of the power reels, a horizontal section of the carriage and showing the position of two of the supply stacks or racks;

Fig. 4, a plan view of the needle receiving socket on the power reel with its guide in section;

Fig. 5, an elevation of the needle receiving socket and guide looking in the direction of the arrows 5—5 of Fig. 4;

Fig. 6, an arcuate section of the needle receiving socket on the power spool taken on line 6—6 of Fig. 1 just prior to the insertion of the needle for attachment of the needle and the connected wire to the power spool;

Fig. 7, a similar sectional view showing the needle fully inserted;

Fig. 8, a similar sectional view showing the needle in its retained position;

Fig. 9, a similar sectional view showing the needle being pushed forwardly just prior to removal of the needle at the completion of the unwinding of the strand recording;

Fig. 10, a fragmentary section on line 10—10 of Fig. 1 showing the detent for stopping the power spool in fixed position;

Fig. 11, a view similar to Fig. 10, showing the detent in position to permit the power reel to freely rotate during the rewinding operation;

Fig. 12, a fragmentary elevation with parts in section of the clutch transfer mechanism as the carriage is moving between stations and approaches its station;

Fig. 12A, a section on line 12A, 12A of Fig. 12, showing the drive gear arrangement for moving the carriage between stations;

Fig. 13, a view showing the carriage after reaching its station;

Fig. 14, a view showing the carriage in an intermediate position at a station;

Figs. 15, 16, and 17, sectional views showing the cam arrangement at the station in other positions;

Fig. 18, a diagrammatic plan view of the releasing block showing the cam and channel for controlling the transfer clutch;

Fig. 19, a section showing the release block in its actuating position and held there by a latch;

Fig. 20, a similar view showing the latch released and the release block held in raised position by a lug on the carriage;

Fig. 21, a plan view of the carriage control gear;

Figs. 22 and 23, intermediate gears for control of the carriage movement;

Fig. 24, the arm control gear;

Figs. 25 and 26, intermediate gears for the arm control;

Fig. 27, an elevation with parts in section of a portion of the magazine or stack taken generally on line 27—27 of Fig. 3, and showing the reel holder in elevation showing the latch for preventing release of the self-winding spring showing the driving tongue on the rewinding spring motor and the latch for retaining the reel holder in the magazine;

Fig. 28, a detail of the main drive shaft and the friction wheel mounted on its slide for cooperation with the selected power reel;

Fig. 29, a section taken generally on line 29—29 of Fig. 28 and showing the friction wheel drive for the power reels in inoperative position;

Fig. 30, an elevation of one magnetic recording head;

Fig. 31, a plan view showing the magnetic recording head in operative relation with a dotted line showing of tape contacting guides associated therewith for holding the tape out of contact with the magnetic head when the head is inoperative;

Fig. 32, a wiring diagram illustrating the switch control arrangement.

Briefly stated, the present invention includes a tape or wire recording machine including a plurality of power spools and a plurality of magazines arranged circumferentially of the power spools with each magazine having a number of reels corresponding to the number of power spools. Between the magazines and the power spools, a carriage is mounted for arcuate movement and such carriage carries a plurality of recording heads or reproducing heads or both corresponding to the number of power reels and a plurality of transfer arms corresponding to the number of power spools. At each magazine, selection keys corresponding to the number of power spools are mounted for digital actuation.

The power for rotating the power spools and moving the carriage is supplied by a single reversing motor and upon a selection being made at one of the stations, the carriage moves to that station and the transfer arms thread needles on each supply reel into sockets on the corresponding power reels after which the selected power reel is rotated, the unselected power reels remaining stationary. The tape passing over the recording head or the reproducing head continues through to the end of the tape but the end of the tape remains connected to the supply reel. A projection or other means on the tape actuates a switch on the carriage which de-energizes the selected power spool and the tape is rewound on its supply reel by its individual spring motor and a suitable time delay prevents movement of the carriage and of the transfer arms until the rewinding has been completed.

Although the following description discloses magazines with three reels in each, it is contemplated that the number of reels may be increased as well as the power spools and the recording heads in accordance with total number of selections desired. The machine is intended to be of a portable nature since the wire or tape recordings may be on relatively small supply reels thereby providing for a very compact construction.

Referring more particularly to the drawing, a plurality of power spools 40, 41, and 42 are fixed on tubular shafts 43, 44 and 45 which are rotatably mounted in a sleeve bearing 46 suitably supported on the frame in any desired manner. A bracket 47 has upstanding struts 48 carrying power spool supporting plates 49, 50, and 51 respectively, the lower plate 51 having an extension 52 for positive connection with a movable carriage 53. Said movable carriage 53 is mounted in inner and outer arcuate guides 54 and 55 respectively having suitable grooves for reception of projecting tongues on the carriage so that the carriage is accurately guided in an arcuate path about the axis of the power spools. A power shaft 56 is mounted for rotation and driven by a conventional reversible electric motor M and upon such power shaft, a sleeve 57 is mounted for sliding movement, the lower end of said sleeve having an opening therethrough and arch-shaped members 58—58 carrying a grooved bearing 59 at their lower ends on which a gear 60 is rotatably mounted. The gear 60 is fixed on the shaft 56 whereby rotation of the shaft causes the gear to rotate, the sleeve being prevented from rotation by suitable means. A portion of the sleeve 57 extends downwardly between the arched portions 58 and a lever 61 pivoted at 62 is urged by a spring 63 to the position shown in Figs. 28 and 29. The lower end of lever 61 carries a groove bearing 64 having a tongue 65 projecting outwardly therefrom and upon the grooved bearing 64 a friction disk 66 is rotatably mounted. Such friction disk having an inner periphery 67 for frictional driving engagement with the shaft 56 and having an outer periphery 68 for driving engagement with one of the driving wheels 48A, 49A, or 50A for the power reels. Although only three power reels have been shown, it will be obvious that the number may be increased by merely adding other tubular shafts and driving disks, the actual number being seven but the illustration being limited to three for simplicity and to avoid undue length.

Depending downwardly from bracket 47 is a supporting member 69 on which is mounted a main solenoid 70 which is operatively connected to the sleeve 57 for raising the sleeve upon energization of the solenoid 70. Also mounted on support member 69 are slidable rods 71, 72, 73, and 74, controlled by solenoids 75, 76, 77, and 78 respectively. The rods 71 through 74 are spring urged toward the sleeve 57 so that the adjacent end thereof is in the path of movement of the tongue 65 of the grooved bearing 64.

For operating a specific power spool, the slidable rods at the bottom are withdrawn and the tongue 65 contacts the lowermost projecting rod causing the groove bearing 64 to change from its inclined position shown in Figs. 28 and 29 to its horizontal position shown in Fig. 2 with the friction disk engaging the corresponding driving disk of one of the power reels. By proper selection and energization of the solenoids the desired power spool may be rotated.

An auxiliary power shaft 79 having a gear 80 for driving connection with gear 60 is rotatably mounted so as to maintain driving connection with the gears and has its outer end mounted in the carriage for movement with such carriage and is provided with a gear 81 meshing with a gear 82 on a carriage power shaft 83, the auxiliary power shaft 79 maintaining driving relation as long as gear 60 is in the lower position but the driving being discontinued when gear 60 is raised upon energization of the main solenoid 70. The carriage power shaft 83 rotates a gear 84 which may be of the friction type and an idly rotating conical friction member 84 cooperates with such friction disk 84 and with a drive wheel or friction disk 86 which contacts the inner guide 54 for driving the carriage clockwise or counterclockwise as viewed from above, in accordance with the direction of operation of the main motor. Shaft 79 may be provided with a telescoping section 79A to take care of any variation in length thereof.

At each station, A, B, and C (Figs. 2 and 18), an arcuate-shaped release block 87 is mounted for vertical movement in suitable guides and upon one of said guides a latch 88 is pivotally mounted with a cam portion projecting into said release block, as shown in Fig. 19. At each station, a plurality of selection keys 89 shown as numbered from 1 to 7 at each station are mounted for digital depression in accordance with the selection desired and each key depresses a common plate at each station which plate is connected by a link 90 to a lever 91 pivoted intermediate its ends and connected to the corresponding release block 87 by means of a pin and slot lost motion connection 91A which permits lever 91 to drop slightly so that latch 88 cannot engage it. The lever 91 is provided with a catch 92 for cooperation with the hook 93 of the latch 88 for maintaining the release block in its raised position when one of the keys 89 has been depressed. On the release block 87 is a channel having horizontal top flanges 94 for reception of an enlarged lug 95 suspended from the carriage 53 by a shank. Said lug 95 being receivable in the channel and engageable with the cam on latch 88 when the lug passes through approximately the center portion of the arcuate channel formed by flanges 94, thereby releasing latch 88 and permitting lever 91 to drop out of the position in which latch 88 can retain the lever 91 and permit release block 87 to drop to the dotted line position shown in Fig. 19, but this is prevented as long as the release block is retained in full line position by the lug 95 as long as lug 95 is within channel 94.

The release block 87 remains in operative position as long as the lug 95 remains within the channel formed by flanges 94. Before the carriage moves to one of the stations and before a lug 95 engages the channel 94, the carriage is moved by a drive from auxiliary shaft 79, gears 81 and 82, drive shaft 83, driving gear 84 which contacts conical gear 85, which, in turn, drives gear 86, which engages the stationary inner arcuate guide wall 54 and moves the carriage along in accordance with the direction of operation of the main driving motor. However, when the carriage approaches a station and the release block 87 is raised at that station, the lug 95 suspended from the carriage, maintains the release block in position and a slidable rod 96 strikes a cam surface 97 on the releasable block 87 raising such rod 96 and a clutch control plate 98 to the position shown in Fig. 13, thereby causing the engagement of a clutch element 99 on shaft 83 to engage a cooperating clutch element on a gear 100 and also causing a clutch element 101 to engage with a clutch element 102 which is drivingly connected to a gear 103, which gear 103 engages a rack 104 on the inner arcuate guide 54 for accurately controlling forward and reverse movements of the carriage when the gear 86 no longer has control thereof. As the carriage is moving forwardly, a sleeve 105 connected to conical gear 85 rides up upon cam surface 106 to the position shown in Fig. 14 where it no longer drives gear 86 and the power shaft 83 then drives gear 100 and through other gearing drives gears 102 and 103, moving the carriage in a predetermined pattern.

The gear 100 drives a bevel gear 109 fixed to a shaft 114 which carries a continuous bevel gear 108 meshing with another bevel gear of the same size 110 fixed on a shaft 111. Upon shaft 111 is mounted a segmental gear 112 and upon shaft 114 is mounted a segmental gear 113 which gears 112 and 113 alternately mesh and drive a double bevel gear 107 which is drivingly meshing with gear 102, and which through clutch 101 operates gear 103 to move the carriage in its arcuate path. The segmental gears 112 and 113 are arranged to produce the necessary limited forward and reverse movement of the carriage at each station in accordance with the movement of the needle threading arm hereinafter described.

Rotatably mounted upon the carriage is a vertically extending, arm-supporting shaft 115 on which needle-carrying arms 116 having a radially extending portion 116A, a diagonal portion 116B, and an arcuate end needle-carrying portion 117, the number of needle-carrying arms corresponding to the number of power reels, shown as being three, but the number could be increased to any desired extent, for example, seven. Fixedly secured to the lower end of shaft 115 is a bevel gear 118 meshing with one face of a double bevel gear 119 mounted for rotation on a suitable shaft. The gear 100 as well as a gear 120 are connected together and rotated in unison. Meshing with the gear 120 is a bevel gear 122 fixed on a shaft 123 carrying a bevel gear 124 which meshes with a bevel gear 125 on a shaft 126. Fixedly carried by shafts 123 and 126 are segmental gears 127 and 128 respectively which alternately mesh with the beveled portion 129 of gear 119, whereby the gear 119 and gear 118 are alternately rotated in opposite direction for moving the needle-carrying arms to thread the needles to the power spool and carry the needles back from the power spools to the supply reels.

The supply reels are mounted in racks or magazines at each of the stations A, B, and C with each rack having a plurality of compartments 130 for receiving reel holders 131 carrying a reel on a shaft having a slot thereacross for receiving a tongue 132 on the driven shaft of a spring motor in a housing 133. A portion of a gear 134 in the gear train is shown exposed in Fig. 27 and is engaged by a latch 135 which is urged by a spring 136 into engagement with the teeth of the gear 134 for normally preventing operation of the rewind motor when the reel holder 131 is removed. The presence of a reel holder 131 in the compartment 130 depresses the upstanding portion of lever 135 and causes the lower end to move out of engagement with the gear 134 and, at such time, the tongue 132 of the spring motor engages into the slot in the shaft of the reel whereby the spring motor exerts a torque on the reel, the above structure permitting the reels to be replaced without having the tension in the spring motor lost. A slot in the lower surface of the reel holder 131 permits the reel holder to pass over the tongue 132 of the spring motor to permit insertion and removal of the reel holders 131. The reel holders are retained in position by means of a spring latch 137 which may engage the outer edge of the reel holder. The outer end of the wire or tape strand is fixed to a needle 138 which is retained in a holder 139 formed as a part of each reel holder 131, the side of the compartment being provided with a slot 140 for receiving the arcuate portion 117 of the needle-carrying arm. The arcuate portion 117 of the needle-carrying arm may be a rectangular section and may have a spring thereon for frictional pressure against the needle 138 which is provided with a correspondingly shaped opening to receive the arcuate end portion of the arm and the spring on the arm. The spring could be in either the needle or on the arm, but in either case the needle is retained on the arm. The needle is also provided with a cutaway terminating in an abutment 141.

Each reel holder 131 has the reel itself rotatably mounted within the holder. As an integral part of the reel holder the needle holder 139 is formed for maintaining the needle or connector 138 in proper position for engagement with the arcuate portions 117 of the arms 116. With this arrangement it will be obvious that the reels may be removed by merely depressing the spring latch 137 and withdrawing the reel holder outwardly. The tongue 132 of the spring motor permits the supply reel holder with the reel to be withdrawn outwardly and the needle which is attached to the tape or wire is withdrawn simultaneously with the reel holder since the needle holder 139 is a part of the reel holder 131. As a result of this arrangement the reel holders may be readily changed so that different recordings may be substituted from time to time in the apparatus.

Each power spool is provided with a needle-receiving structure including a removable element 142 secured by screws or the like to the reel and carrying an arcuately shaped guide 143 in which is mounted an arcuate-shaped needle-receiving slide 144, such needle-receiving slide being connected to the removable element by a coil spring 145 so that the needle-receiving slide 144 may move longitudinally within the guide. The guide is provided with a slot through its lower surface and the needle-receiving slide is similarly slotted for receiving the points of teeth of a first ratchet 146 mounted on a shaft rotatably supported in the removable member 142. A second ratchet 148 is also mounted on shaft 147 and has double the number of teeth of ratchet 146. Mounted on the needle-receiving slide 144 is a pawl 149 which is spring pressed into contact with the teeth of ratchet 148 and the guide 143 is slotted to permit connection of the pawl 149 to the slide 144 and to permit longitudinal movement of the pawl.

Referring to Fig. 6, the needle 138 is shown about to enter the needle-receiving slide 144 and the ratchet 146 is in its inoperative position. The needle enters the slide 144 as shown in Fig. 7 compressing the spring 145 and causing the pawl 149 to rotate the ratchet 148 and thereby ratchet 146 is rotated one-eighth of a turn placing one tooth thereof in the path of the shoulder 141 on the needle 138. Fig. 8 shows the needle being retained by the ratchet 146, the needle remaining in this position until the strand recording has been played and the arcuate end 117 again enters the needle 138 moving the needle-receiving slide 144 forwardly as shown in Fig. 9 until the ratchet 146 is moved one-eighth of a turn, thereby retracting the tooth of the ratchet 146 out of the path of the needle and the needle being then free for removal by the arcuate-shaped portion 117 of the arm, and the needle-carrying arm then may return the needle to the supply reel.

Each power spool supporting plate 49, 50, and 51 respectively carries a stop 150 for cooperation with a detent 151 pivotally mounted at 152 on the power reel and normally urged by a spring or the like to its outer position shown in Fig. 10 for engagement with the stop 150 but such detent is retractable to the position shown in Fig. 11 by the presence of the strand material being wound on the reel thereby exerting a force on the outer edge of the detent overcoming the force urging the detent to the position shown on Fig. 10. On the approach side of the stop 150 is a resilient spring 153, which contacts the finger 154 on the detent thereby slowing up the power reel just prior to the abutment of the finger against the stop 150 and the spring also serving to retain the reel in abutting relation to the stop 150 thereby locating the needle-receiving guide 143 in position for the threading operation, as well as for the unthreading operation.

Upon the carriage 53 is supported a series of recording heads or magnetic transmitting units 155 having each the magnetic recording member 156 thereon and a pair of pivoted fingers 157 which are spring urged to the dotted line position in which the free ends of the fingers may contact a tape 158 to prevent the tape from engaging the magnetic member 156. However, when the magnetic member 156 is energized, the fingers 157 are moved to their full line position as shown in Fig. 31 and the magnetic tape or wire comes into operative relation with member 156 producing the impulses for reproducing the sound.

*Operation*

Assuming the main motor M to be energized, the main shaft 56 is rotated; and through bevel gears 60 and 80, auxiliary shaft 79 is rotated; and through gearing 81, 82, shaft 83, gear 84, conical gear 85, and gear 86, the carriage 53 is moved along the arcuate tracks 54 and 55. The arcuate track is of sufficient length to accommodate magazines A, B, or C at the respective stations. In the event that none of the keys 89 has been depressed, the carriage will move to the end of its arcuate track where the carriage will contact a reversing switch 159A and 159B (assuming the forward motion to be in a counterclockwise direction). Upon the carriage contacting switches 159A and 159B, the electrical connections of the windings in the motor M are reversed causing the motor to operate in the opposite direction thereby causing the carriage 53 to move in a clockwise direction as viewed from above and after the carriage 53 reaches the limit of its clockwise movement, the carriage will engage reversing switches 160A and 160B reversing the electrical connections to cause the motor M to rotate the shaft 56 in the forward direction and causing the carriage 53 to move counterclockwise. The alternate counterclockwise and clockwise movements of the carriage 53 continue as long as the main switch is energized and until one of the keys 89 at one of the stations is depressed. Assuming that the carriage 53 is moving in the forward (counterclockwise) direction and key No. 1 at station A (165–A–1) is depressed, a plate connected to the upper end of link 90 is depressed and causes the associated lever 91 to raise the release block 87 at station A to the operative position shown in Figs. 2 and 19, and such release block remains in its raised position until the lug 95 on the carriage strikes the projection on the latch 88 thereby allowing the release block and the connected lever arm 91 to be released. However, the release block is retained by the lug 95 within the channel 94. Further motion of the carriage 53 causes the rod 96 to engage its cam 97 and be raised thereby drivingly connecting gears 100 and 120 to the shaft 83. Simultaneously, clutch 101 drivingly connects gear 102 to gear 103, gear 102 being drivingly connected to the gear 100 by the elements 107 to 114 inclusive, the gear 103 serving to move the carriage forwardly and rearwardly by engagement with the rack 104, the needle-carrying arms 116–I, 116–II, and 116–III are operated in timed relation from gear 120 and the associated driving mechanism including elements 118 to 128 inclusive.

The needle-carrying arms 116 are normally in their inoperative position shown in Fig. 1, and the power reel supporting structure 48, supporting plates 49–51 inclusive, as well as the power reels are moved with the carriage 53 by connecting element 52 for maintaining the needle-receiving guides 143 in operative relation to the arcuately shaped portions 117 of the needle-carrying arms 116, the carriage being moved to the appropriate position for the arms to pick up a needle 138 at one of the stations. Each arm 116 is maintained out of the path of the supply magazines A, B, and C and assuming the carriage moving in the counterclockwise direction, when it is desired to pick up the needles and before the carriage reaches the station A, B or C which has been selected, the needle arms are moved clockwise to their extreme right position. When the carriage stops at the selected station the arms are in position to have arcuate portions 117 engage the sockets in the needles and each arcuate portion 117 is arcuately aligned with its needle 138 and upon counterclockwise movement of arms 116 each arcuate portion 117 is impaled in its needle 138. The needles and their attached tapes 158 are moved into the corresponding sockets in the power reel where the needles are retained by the ratchets 146 and the arms 116 are returned to their neutral position shown in Fig. 1. A switch 161 is mounted in the path of the lowermost arm 116 and is of the type to be actuated by clockwise movements only of the arms 116. At one clockwise pass of arms 116 the switch 161 is closed, and at the other clockwise pass of arms 116, the switch 161 is opened. Such switch 161 will not operate upon counterclockwise movement of the arms 116 but will operate through one cycle by two clockwise passes of arms 116. Assuming that arms 116 have moved to the extreme clockwise position and picked up the needles at a single station, the needles are deposited in the sockets 144 of the power reel and upon restoration of the arms 116 to the position shown in Fig. 1, the switch 161 has been actuated causing the selected magnetic head to be actuated, causing the solenoid 70 to be energized, raising sleeve 57 thereby breaking driving connection between gears 60 and 80 and interrupting the power for the carriage and the needle transfer arms 116. The appropriate solenoid 78 is operated to withdraw the slide 74 and the tongue 65 of grooved bearing 64 engages the rod 73 causing the grooved bearing 64 to assume a horizontal position and moving the friction disk 66 to engage the shaft 56 and the driving wheel 50 for rotating power reel 42 thereby winding the tape onto the power reel until the end of the tape has been reached. When the end of the recording is reached, the switch 162–I on the carriage is actuated by engagement with a projection on the corresponding tape or by other means thereby opening the switch.

The switch 162–I on the carirage after once being opened by the completion of the recording is held open by the presence of the tape which is maintained under tension by the spring motor in the magazine and while the needles remain in engagement with its power spool.

Referring more particularly to Fig. 32 and the wiring diagram therein, the switches shown in the dotted line rectangles 53 are mounted upon the carriage 53.

To state the operation differently and more specifically assuming that the sound recording apparatus is in operative but the switches are arranged to energize motor coil 164 for counterclockwise movement of carriage 53, and it is desired to play the first recording which is considered to be the top reel in stack A, the main switch 163 from one side of a power line is closed, the other side of the power line being grounded; at this time the switch 161 operated by arm 116–III is open and the power is carried to motor winding 164 which produces the forward rotation of the motor which results in the counterclockwise movement of the carriage and if nothing further is done, the carriage merely moves clockwise and counterclockwise as explained above. However, if a key No. 1 at station A indicated as 165–A–I is depressed, the switch corresponding to that key is closed grounding a circuit of trolley 166–A–I and switch 162–I, thereby energizing a relay 167–I which causes switches 168–I, 169–I, 170–I, and 171–I to move from the positions shown to their lower positions, the motor M continuing its forward rotation, the selecting key 165–A–I remaining depressed keeping its switch closed and also depressing a plate common to all the keys in that station downwardly causing link 90 connected to the plate to be lowered rocking lever 191 and raising releasing block 87 to its operative position where it is retained by the latch 88 and continued movement of the carriage causes the lug 93 to engage in channel 94 and retain the releasing block in its raised position.

The cam surface 97 on release block 87 raises the rod 96 causing the control plate 98 to bring the clutch 91 and 101 into operative position whereby the gear 100 takes control to move the carriage forwardly and backwardly while the rod 96 and sleeve 105 are in contact with their cam surfaces on release block 87. At the same time, gear 120 on the carriage is actuated causing the needle-carrying arms 116 to be swung from their neutral position shown in Fig. 1 to the position shown in Fig. 2 while the carriage continues to move counterclockwise to align the arcuate portions 117–I, 117–II, 117–III of the arms 116–I, 116–II, 116–III to be located rearwardly of the needles 138–A–I to III and rearwardly of the needle holder 139–A–I to III respectively, the carriage then moves to its final position at station A and the arcuate portions 117–I to III of the arm 116–I to III passes into the openings in needle 138–A–I to III. The arms 116 then swing counterclockwise and deposit the needles 138–A–I to III in the needle-receiving slides 144 as shown in Fig. 7. The arms 116 then return to their neutral position and the lowermost arm 116–II engages the switch 161 causing such switch to be closed. Since relay 167–I is grounded because of the depression of key switch 165–A–I, the circuit is completed with switch 169–I in its lower position energizing solenoid 78 thereby withdrawing rod 74 out of the path of tongue 65 of the grooved bearing, the circuit to main solenoid 70 being completed simultaneously through switch 170–I whereby the sleeve 57 and the friction disk 66 are raised into contact with driving reel 50. The motor M remaining energized through switch 168–I and power reel 42 is rotated causing the tape or wire, as the case may be, to pass over recording head 155–I, which remains energized as long as relay coil 167–I is energized since all of the switches thereabove are moved to their lower position. The winding reel 42 continues to rotate until a projection on the wire adjacent the supply reel actuates switch 162–I to open such switch thereby de-energizing relay coil 167–I.

In the event that another key at station A has been depressed such as key 172–A–II, then immediately following the opening of switch 162–I, the switches controlled by relay 167–I will assume the position shown in the drawing but the switches actuated by relay coil 167–II including switches 168–II, 169–II, 170–II, and 171–II immediately upon opening the switch 162–I, the relay actuated switches 168–II, 169–II, 170–II and 171–II will move to their lower positions causing the solenoid 77 to withdraw its rod 73 and main solenoid 70 being energized will raise the friction disk 66 into contact with friction wheel 49 thereby rotating power reel 41 and the tape or wire recording from supply reel II of station A will be played until the end of the tape reaches switch 162–II causing such switch to open thereby de-energizing relay 167–II and permitting the switches controlled thereby to return to their positions shown in the drawing. It will be noted that the recording controlled by switch 172–A–II commences its operation immediately upon the completion of the recording controlled by switch 165–A–I whereby selections or programs of greater length than can be accommodated on one spool or reel may be played by having one part on supply reel I, the second part on supply reel II etc. and when there are seven supply reels the time may be sufficient to reproduce or record programs of great length without interruption as the solenoid 70 will immediately move the friction wheel 66 upwardly to contact the driving wheel next above as soon as the recording on one reel is completed.

If no other switches are actuated at station A, the time delay 173 becomes energized through the switches 168–I, 168–II, 168–III, the main solenoid 70 immediately is de-energized and slide 57 drops allowing the power reels to rotate freely so that friction disk 66 is out of contact with all driving wheels. During this interval, there is no actuation of the main motor and the spring motors on supply reels A–I and A–II rewind their tapes on their rewind reels until the ends of the tapes are reached and the tapes release detents 151 on the power spools which detents drop to the position shown in Fig. 10 and engage retarding spring 153 and ultimately the power reels stop with the detents 151 against stops 150, the switches 162–I and 162–II being retained open during this time by the tension in the tape. After a predetermined time controlled by time delay 173 permitting the tapes to be wound on their supply reels, the switch 174X is opened and solenoids 77 and 78 that have been energized are de-energized and slide rods 73 and 74 return to obstructing position shown but the slide 57 is now in its lower position and the return of slide rods 73 and 74 cannot interfere; the switch 174 is closed by the time delay 173 thereby energizing the winding 164 of the main motor M. Therefore motor M runs in its forward direction but the solenoid 70 has been de-energized and the gear 60 is in engagement with gear 80 thereby driving the gear train in the carriage and such gear trains in the carriage cause the arms 116 to be moved from their neutral position in a counterclockwise direction so that the arcuate portion 117 of each arm engages in the corresponding needle 138 in the power reel, causing its needle-receiving guide 144 to move forwardly as shown in Fig. 9 causing its sprocket 148 to be moved one tooth and its sprocket 146 to be moved so that the teeth thereof are clear of the abutment 141 on the needle. Thereafter the needle-carrying arms 116 are moved in a clockwise direction with the portion 116–A of the bottom arm engaging switch 161 causing the switch 161 to open and at substantially the same time switches 162–I and 162–II are closed by their spring pressure when the tapes no longer press on switches 162–I and 162–II, and the continuation of clockwise movement of arms 116 deposits the needles 138 in the needle holders 139 of the supply magazine A; and further motion of the arms 116 in a clockwise direction causes the arcuate portions 117 to move out of the needles 138 thereby completely releasing the needles from the carrying arms 116. At this time the carriage 53 moves rearwardly or clockwise a sufficient distance so that the arcuate portion 117 clears the needles 138 and the needle-carrying arms are restored to their neutral position shown in Fig. 1.

If none of the keys at the other stations has been depressed, the continued rotation of the motor M causes the carriage to move forwardly a sufficient distance so that rod 96 and sleeve 105 pass beyond the release block as shown in Fig. 17, thereby returning the control of the carriage into the drive including carriage drive shaft 83, gear 84, conical gear 85, and gear 86 which engages the inner track causing the carriage to be moved forwardly or counterclockwise. This continues and lug 95 passes out of channel 94 permitting release block 87 to drop and if no other keys have been depressed when the carriage moves to its extreme forward or counterclockwise position, the switches 159–A and 159–B are actuated causing the motor M to be reversed by energizing the reversing windings 175, as will be obvious from an inspection of the reversing switches.

It may be noted that a switch 176 is located on the support 69 and is actuated by a collar 178 carried by the sleeve 57 so that the switch 176 is moved in a direction to close the circuit to winding 175 for causing reverse movement, but such switch 176 is normally ineffective depending upon the position of switches 160B and 159B which are actuated by the carriage 53. If switches 160B and 159B are in the position for reversing the direction of movement of the carriage, then the switch 176 is effective to energize the reverse winding 175 of the motor only when the slide 57 is in its lower position and the carriage then moves in a clockwise or reverse direction.

If none of the keys are depressed, the carriage moves clockwise and counterclockwise, being reversed by switches 159A to 160B and switch 176 as long as main switch 163 is maintained closed. Assuming that the carriage is at its extreme counterclockwise position and is now moving clockwise and a key, for example 172–C–II is depressed, the corresponding clutch release block 87 at station C will be raised by a linkage similar to that shown in Fig. 2 and the downwardly extending lug 95 on the carriage will engage in the channel 94. The carriage will be moving in its clockwise direction which will cause the rod 96 to be raised and sleeve 105 to be raised in the sequence shown beginning with Fig. 17 to Fig. 12, in that order which is just the reverse of the previously described counterclockwise movement of the carriage. The gearing arrangement is such that the carriage is moved clockwise beyond its station a sufficient distance while lug 95 is in channel 94 to permit the arms 116 to be moved to their extreme clockwise position so that the arcuate portions 117 of the arms are clear of the needles 138 at station C and then the carriage is caused to move counterclockwise to its position of operation at station C and the arms 116 are all moved counterclockwise causing the arcuate portions 117 to engage and move the needles 138 from station C to the needle receiving slides 144 in the power reels, and the needles are retained therein and the arms 116 are returned to their neutral position shown in Fig. 1, the tapes having been properly threaded.

At that time the lowermost arm 116 has passed over switch 161 closing such switch and energizing main solenoid 70 and solenoids 78 and 77 thereby withdrawing rods 74 and 73 respectively, from the path of the tongue 65 of the grooved bearing 64. The energization of solenoid 70 raises the sleeve 57 and the collar 178 carried thereby so that the end of the switch lever 176 is free from collar 178 permitting the switch 176 to be urged to its upper position by a spring which causes the switch to engage contact 164*a* so that the motor M can then rotate only in the correct direction for rotating the selected power spool 41 in the clockwise direction as viewed in Fig. 1. The simultaneous energization of solenoid 70 and solenoids 78 and 77 with the resulting withdrawal of rods 74 and 73 respectively from the path of the tongue 65 of the groove bearing 64 and the raising of the sleeve 57 disengaging driving gears 60 and 80 preventing movement of the carriage 53. Solenoid 79 moves the slide 57 upwardly causing tongue 65 to engage rod 75 thereby causing friction disk 66 to simultaneously engage the appropriate driving wheel 49A thereby powering the drum and the II recording at station C is played.

After the recording is completed the switch 162–II is opened by a projection on the tape and remains open, and solenoid 70 is de-energized causing slide 57 to drop thereby disengaging friction disk 66 from driving wheel 49A and causing engagement of gears 60 and 80 and also causing switch 176 to be operated by collar 178 on slide 57 permitting the power reel to rotate freely. The main motor M is inactive at this time. The tape is rewound on its supply reel by the spring motor and after the predetermined time delay, controlled by time delay 173, arms 116 move counterclockwise engaging the needles in the power spool and then arms 116 move clockwise returning such needles to the needle holders 139 in the racks. The needles are stripped from the arcuate portions 117 of the arms 116, but the solenoids 77 and 78 remain energized until the switch 161 is opened by the clockwise movement of the arms 116 thereby assuring that the slide 57 could drop to the position shown in Fig. 2 without any interference from the rods 73 and 74. The gearing controlled by gears 100 and 120 of the carriage are therefore operated in their reverse direction during the clockwise movement of the carriage 53 and the arms 116 are timed as described above. The switch 176 is effective to reverse the motor M only in the clockwise movement of the carriage by energizing motor coil 175, the switches 159A to 160B serving to condition the circuits for proper operation of the motor M.

Similarly, other keys may be depressed at the other stations during the clockwise movement of the carriage and the carriage will stop and play the selected tune at such station. It will be evident that the recording or reproducing heads 155–I, 155–II, 155–III are connected to an appropriately located speaker and amplifier unit designated by 183 and since the structure of such speaker and amplifier system is well known, a detailed description thereof is omitted.

From the above, it will be apparent that various selections may be made at the various stations and they will be played one after the other at each station and after completion of the recordings at that station, and after the tapes have been rewound on their supply reels and the needles returned to the magazines, the carriage moves on to the next station in the direction which it had previously been going, as determined by the switches 160A, 160B, 159A, 159B, and 176. The keys 165–A–I, 165–B–I, 165–C–I are connected to trolley wires 166–A–I, 166–B–I, and 166–C–I. On the carriage 52 is a trolley 180–I having a pair of contacts 181–I and 182–I which contacts 181–I and 182–I bridge the space between adjacent trolley wires 166–A–I and 166–B–I.

Similarly, switches 172–A–II, 172–B–II, and 172–C–II are connected respectively to trolley wires 166–A–II, 166–B–II, 166–C–II and likewise for switches 179–A–III, 179–B–III, and 179–C–III, connected respectively to trolleys 166–A–III, 166–B–III, and 166–C–III.

From the above, it will be evident that applicant has provided a recording and sound reproducing machine which is automatic in its operation merely requiring the closing of main switch 163 and the actuation of the appropriate keys at the various stations causing the selected wire or tape to be wound on the power spool and the recording reproduced in a well known manner or the device may be used for reproducing sound as desired.

Although the structure has been described without reference to a particular type of support or casing, it is contemplated that the structure may be made relatively compact and a supporting casing may be provided with a base 183 and suitable side walls 184, 185 and portions of the magazines at stations A, B, and C may project outwardly from the casing and the selection keys 89 are located outwardly of the side walls 185 so that the casing may remain substantially closed and the servicing may be made without danger of damaging the equipment. A suitable cover (not shown) with a suitable carrying handle and the like may be provided and portions of the walls may be made transparent if desired.

The magazines may be removed as units or the reels may be replaced while the magazines are in position.

It will be obvious to those skilled in the art, that various changes may be made in the invention without departing from the spirit and scope thereof, and therefore, the invention is not limited by that which is shown in the drawings and described in the specification, but only as indicated in the appended claims.

What is claimed is:

1. Sound recording and reproducing equipment comprising at least one power spool, a plurality of supply spools having strand recordings arranged in spaced relation to the power spool, and means located between the power spool and the supply spools and unattached to any spools for transferring an end of a strand recording to the power spool, and means for rotating said power spool and recording sound thereon.

2. A strand recording and reproducing system comprising amplifiers, speakers and microphones, the combination of a power spool, a plurality of supply spools having strand sound recording and reproducing material thereon, a carriage, sound reproducing and recording heads on said carriage, means on said carriage to thread the strand material from a selected supply spool to the power spool and past the recording and reproducing head, said means to thread the strand material being unattached to any of said spools, said amplifiers, speakers and microphones being operatively connected to said heads for energization thereof, and means for energizing said head and causing said power spool to rotate upon the completion of the threading operation thereby causing the sound to be recorded and/or reproduced.

3. The invention according to claim 2 in which said recording and reproducing head which threading means are movable to selected locations between the supply spools and the power spool whereby the selected sound reproducing strand material may be threaded on the power spool and means to select the supply spool containing the strand material to be recorded or reproduced.

4. The invention according to claim 3 in which control means are provided for moving the sound recording and reproducing heads in accordance with a manual selection.

5. Apparatus for carrying ends of strands from first locations on one side of the path of movement of a carriage to second locations on the opposite side comprising a carriage, means to guide the carriage for forward and reverse movement between said first and second locations, a source of power, means on said carriage for moving said carriage in a path between said first and second locations, transfer arms mounted on said carriage for movement from said first locations to said second locations and to a neutral position therebetween, control means in the path of said carriage and actuatable in a desired sequence, means on said carriage driven by said motor for moving said transfer arms, and gearing means on said carriage and controlled by the control means in the path of said carriage for causing said carriage to move forwardly and reversely and to move said transfer arm to carry strand material from said first locations to said second locations.

6. Winding and reeling apparatus comprising supply reels and power reels, strands wound on said supply reels, the outer ends of said strands being provided with arcuately shaped needles, means on said supply reels for maintaining said needles in a definite position, receiving means on said power reels including arcuately shaped guides, arcuately-shaped needle-receiving slides in said guides, means for urging said slides outwardly, means for actuating retaining ratchets in accordance with the movements of said slides, means for transferring said needles from said supply reels to said needle receivers of said power spools, said needles being provided with shoulders for coacting with the ratchets whereby the needles are retained in said needle-receiving slides and said transfer device may be removed therefrom, and said needles may be removed from said needle-receiving slides upon a second actuation of said transfer means to engage said needles to move said ratchets releasing said needles whereby the strand material may be threaded to and removed from the power reels.

7. Driving mechanism for a selected one of a plurality of drums comprising a plurality of concentric hollow shafts, a drum mounted on one end of each shaft, a driving wheel mounted on the other end of each shaft, a source of power including a driven shaft arranged in substantially parallel relation to said concentric shafts, a slide mounted on said driven shaft for axial movement, a pivoted bearing mounted on said slide and rotatably carrying an annular driving ring surrounding said driven shaft, means for pivoting said bearing about an axis transverse to the plane determined by the axes of said driven shaft and said concentric shafts, and means for causing axial movement of said slide, and selecting means for engaging said bearing to cause said annular ring to simultaneously engage said driven shaft and the selected one of said driving wheels.

8. Intelligence receiving and reproducing equipment comprising means to support a plurality of supply reels of strand material in spaced relation, power driven reel means in operative relation with respect to said supply reels, and means unattached to said reels to selectively connect the strand material on any one of said supply reels to said power reel and intelligence-reproducing means cooperable with the strand material passing from selected supply reel to said power reel, whereby an intelligence may be reproduced or recorded on said strand material.

9. Intelligence receiving and reproducing equipment comprising a plurality of sets of supply reels, power driven reels arranged in spaced relation to said sets of supply reels, said supply reels and said power driven reels being spaced apart to provide a clear passage therebetween, a carriage mounted for movement in said passage between said supply and power driven reels, means on said carriage unattached to said reels for transferring the outer end of the strand material on any supply reel to a power reel, and means on said carriage for applying intelligence to or reproducing intelligence from the strand material in any of said reels, and means to select the particular reel to be used.

10. Apparatus for receiving or reproducing intelligence from strip material comprising a base, a take-up reel mounted for rotation on said base, a plurality of supply reels mounted in generally concentric relation to said take-up reel and spaced therefrom, transfer means supported from said base for engaging and transferring an end of the strip material on any one of said supply reels and engaging such end to said take-up reel, means on the take-up reel to secure the end of the strip material to the take-up reel, means to rotate said take-up reel to remove strip material from the supply reel, and means in the path of said strip material for applying or obtaining intelligence from said strip material, said transfer means being completely free of said supply and take-up reels, and the transfer means being movable relative to the supply reels whereby a single transfer means may be used for any of the supply reels.

11. Apparatus for receiving or reproducing intelligence from strip material comprising a base, a take-up reel mounted for rotation on said base, a plurality of supply reels mounted in generally concentric relation to said take-up reel and spaced therefrom, transfer means supported from said base for engaging and transferring an end of the strip material on any one of said supply reels and engaging such end to said take-up reel, means in the path of said strip material for applying or obtaining intelligence from said strip material with said transfer means drawing the strip material across the intelligence receiving or reproducing means, means on the take-up reel to secure the end of the strip material to the take-up reel to remove strip material from the supply reel, the transfer means being completely free of the supply and take-up reels, and the transfer means being movable relative to the supply reels whereby a single transfer means may be used for any of the supply reels.

12. In a multiple selection apparatus for magnetic transducing, the combination of a plurality of independent tape holders arranged in several rows, a plurality of said tape holders in each row with each tape holder closely adjacent the next forming the length of each of said rows, the rows extending in length in the same general longitudinal direction with each row positioned in lateral closely adjacent generally parallel relation to one another, each of said tape holders comprising a hub with a separate length of magnetic tape wound about each of said hubs, magnetic transducing means, means for selecting any one particular row, means whereby the magnetic tape of any tape holder within said row may be individually selected for transducing, said means for selecting a row including means adapted to move said transducing means laterally of the length of said rows to a position adjacent the selected row, means including said transducing means whereby the magnetic tape of the selected tape holder in the selected row may be individually transduced magnetically, means to place together the selected magnetic tape and the magnetic transducing means in an aligned engaging contacting relationship, drive means for moving magnetic tape lengthwise relative to the transducing means, means to connect the selected magnetic tape to said drive means whereby the selected tape is driven lengthwise and in continuing contacting engagement across the transducing means.

13. A multiple selection apparatus according to claim 12 wherein the means to connect the selected magnetic tape to the drive means comprises movable arm means positioned adjacent the magnetic tape, tape receiving means on the drive means with the magnetic tape having portions cooperating with said movable arm means whereby the arm means moves and attaches the magnetic tape to said tape receiving means of the drive means in the manner enabling the drive means to move the magnetic tape in its lengthwise direction.

14. A multiple selection apparatus according to claim 12 in which the rows extend in a substantially vertical direction, the plurality of tape holders comprise at least three in number in each row with each of the tape holders in only one row, arranged in relatively close superimposed relation along a generally common vertical axis, and with the means adapted to move the transducing means laterally of the rows comprising a carriage moveable along a horizontal path relative to the vertical rows to its position opposite the selected row.

15. Intelligence receiving and reproducing equipment comprising framework, a plurality of supply reels in spaced relation having strand material wound thereon, each supply reel being substantially enclosed within a separate hollow strand holder, supporting means on said framework for detachably mounting said holders with the reels of strand material therein, a strand connector for each holder, said strand connector being affixed at the outer end of said strand material and positioned on said holder adjacent one edge of the holder, each strand holder having retaining means thereon to retain said strand connector adjacent said one edge of said holder so that each holder, including its strand material and its connector, may be detached as a unitary body from the supporting means of the framework, power drive takeup reel means in spaced operative relation with respect to said holder enclosed supply reels, means to release said retaining means, transfer means unattached to said supply reels to selectively engage the strand connector of any one of the supply reels and connect the connector and its attached strand of said selected supply reel to said power reel means, and intelligence transducing means cooperable with the strand material passing from a selected reel to said power reel means, whereby intelligence may be recorded or reproduced on said strand material, each of said holders having position cooperating surfaces located at said one edge of the holder to cooperate in positioning said strand connector at said one edge so that said holder when attached to said supporting means will be in alignment with respect to the transfer mechanism to enable the engagement of said transfer means to said connector, rewinding means for rewinding the strand material onto the reel after recording or reproducing, said supply reels having portions which are unenclosed by said holders to provide access for said rewinding means to engage said portions of the reel for rotating the reel relative to the holder and accomplish said recording, each holder providing bearing support for its supply reel to facilitate substantially uniform alignment of the holder relative to the supply reel.

16. Intelligence receiving a reproducing equipment according to claim 15, wherein said transducing means and tape holders are relatively movable to facilitate recording or reproducing, and said power reel means, and supply reels are mounted with their center axes in substantially parallelism with one another.

References Cited in the file of this patent

UNITED STATES PATENTS

| | | |
|---|---|---|
| 1,253,372 | Gotti | Jan. 15, 1918 |
| 2,086,130 | Hickman et al. | July 6, 1937 |
| 2,203,655 | Lechleitner et al. | June 4, 1940 |
| 2,208,930 | Kahlish | July 23, 1940 |
| 2,227,259 | Hokanson | Dec. 31, 1940 |
| 2,338,914 | Esser | Jan. 11, 1944 |
| 2,345,869 | Edwards | Apr. 4, 1944 |
| 2,478,763 | Kadish | Aug. 9, 1949 |
| 2,481,398 | Danisch | Sept. 6, 1949 |
| 2,488,482 | Swarthout et al. | Nov. 15, 1949 |
| 2,542,917 | Fischer et al. | Feb. 20, 1951 |
| 2,560,234 | Masterson | July 10, 1951 |
| 2,561,503 | D'Ornellas | July 24, 1951 |
| 2,601,955 | Hardenberg | July 1, 1952 |
| 2,659,538 | Perry et al. | Nov. 17, 1953 |
| 2,676,212 | Williams | Apr. 20, 1954 |

UNITED STATES PATENT OFFICE

CERTIFICATION OF CORRECTION

Patent No. 2,964,593 December 13, 1960

Robert Elick Kleve

It is hereby certified that error appears in the above numbered patent requiring correction and that the said Letters Patent should read as corrected below.

Column 15, line 32, for "only" read -- any --; column 16, line 24, for "recording" read -- rewinding --; line 30, after "means" strike out the comma.

Signed and sealed this 20th day of June 1961.

(SEAL)

Attest:

ERNEST W. SWIDER

Attesting Officer

DAVID L. LADD

Commissioner of Patents